(12) United States Patent
Nguyen et al.

(10) Patent No.: US 7,730,950 B2
(45) Date of Patent: *Jun. 8, 2010

(54) METHODS FOR TREATING INTERVALS OF A SUBTERRANEAN FORMATION HAVING VARIABLE PERMEABILITY

(75) Inventors: Philip D. Nguyen, Duncan, OK (US); David L. Brown, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/655,443

(22) Filed: Jan. 19, 2007

(65) Prior Publication Data
US 2008/0173448 A1    Jul. 24, 2008

(51) Int. Cl.
*E21B 43/16* (2006.01)
*E21B 33/13* (2006.01)

(52) U.S. Cl. .................. 166/305.1; 166/300; 166/285; 166/295

(58) Field of Classification Search .................. 166/270
See application file for complete search history.

(56) References Cited

U.S. PATENT DOCUMENTS

| | | | |
|---|---|---|---|
| 2,278,838 A | 4/1942 | Groote et al. | |
| 2,670,329 A | 2/1954 | Jones | |
| 2,689,244 A | 9/1954 | Jones | |
| 2,819,278 A | 1/1958 | De Groots et al. | |
| 2,843,573 A | 7/1958 | Melamed | |
| 2,863,832 A | 12/1958 | Perrine | |
| 2,877,179 A | 3/1959 | Hughes et al. | |

(Continued)

FOREIGN PATENT DOCUMENTS

EP    0 383 337 A2    8/1990

(Continued)

OTHER PUBLICATIONS

Botermans, C. Wouter, et al, *Relative Permeability Modifiers: Myth or Reality?*, SPE eLibrary Paper No. 68973, 2001, Society of Petroleum Engineers, Inc., presented at SPE European Formation Damage Conference, The Hague, The Netherlands, May 21-22, pp. 1-2.

(Continued)

*Primary Examiner*—Zakiya W Bates
*Assistant Examiner*—Angela M DiTrani
(74) *Attorney, Agent, or Firm*—Robert A. Kent

(57) ABSTRACT

Methods of using water-soluble hydrophobically modified polymers to treat intervals of a subterranean formation having variable permeabilities. An exemplary embodiment provides a method of treating an interval of a subterranean formation having a permeability that varies. The method comprises contacting the interval with a water-soluble hydrophobically modified polymer capable of selectively reducing the effective permeability of the interval to water without a comparable reduction of the effective permeability of the interval to hydrocarbons. The hydrophobically modified polymer modifies the interval to have a more uniform permeability without substantially preventing the flow of fluids through the interval. The method further comprises introducing a treatment fluid into the interval. The more uniform permeability of the interval allows for a more uniform treatment of the interval by the treatment fluid than would be allowed without treatment of the interval with the hydrophobically modified polymer.

23 Claims, 1 Drawing Sheet

U.S. PATENT DOCUMENTS

| | | |
|---|---|---|
| 2,910,436 A | 10/1959 | Fatt et al. |
| 3,008,898 A | 11/1961 | Hughes et al. |
| 3,052,298 A | 9/1962 | Mallot |
| 3,065,247 A | 11/1962 | De Groots et al. |
| 3,215,199 A | 11/1965 | Dilgren |
| 3,251,415 A | 5/1966 | Bombardieri et al. |
| 3,251,778 A | 5/1966 | Dickson et al. |
| 3,258,428 A | 6/1966 | Dickson et al. |
| 3,265,512 A | 8/1966 | Dickson et al. |
| 3,271,307 A | 9/1966 | Dickson et al. |
| 3,297,090 A | 1/1967 | Dilgren |
| 3,307,630 A | 3/1967 | Dilgren et al. |
| 3,326,890 A | 6/1967 | Engelskirchen et al. |
| 3,336,980 A | 8/1967 | Rike |
| 3,347,789 A | 10/1967 | Dilgren et al. |
| 3,382,924 A | 5/1968 | Veley et al. |
| 3,404,114 A | 10/1968 | Snyder et al. |
| 3,434,971 A | 3/1969 | Atkins |
| 3,441,085 A | 4/1969 | Gidley |
| 3,451,818 A | 6/1969 | Wareham |
| 3,489,222 A | 1/1970 | Millhone et al. |
| 3,601,194 A | 8/1971 | Gallus |
| 3,647,507 A | 3/1972 | Ashcraft |
| 3,647,567 A | 3/1972 | Schweri |
| 3,689,418 A | 9/1972 | Cenci et al. |
| 3,689,468 A | 9/1972 | Cenci et al. |
| 3,708,013 A | 1/1973 | Dismukes |
| 3,709,298 A | 1/1973 | Pramann |
| 3,744,566 A | 7/1973 | Szabo et al. |
| 3,902,557 A | 9/1975 | Shaughnessy et al. |
| 3,910,862 A | 10/1975 | Barabas et al. |
| 3,943,060 A | 3/1976 | Martin et al. |
| 3,983,941 A | 10/1976 | Fitch |
| 4,052,343 A | 10/1977 | Cunningham |
| 4,052,345 A | 10/1977 | Austin et al. |
| 4,129,183 A | 12/1978 | Kalfoglou |
| 4,129,534 A | 12/1978 | Cunningham |
| 4,142,595 A | 3/1979 | Anderson et al. |
| 4,152,274 A | 5/1979 | Phillips et al. |
| 4,158,521 A | 6/1979 | Anderson et al. |
| 4,158,726 A | 6/1979 | Kamada et al. |
| 4,228,277 A | 10/1980 | Landoll |
| 4,299,710 A | 11/1981 | Dupre et al. |
| 4,306,981 A | 12/1981 | Blair, Jr. |
| 4,337,828 A | 7/1982 | Blair, Jr. |
| 4,366,071 A | 12/1982 | McLaughlin et al. |
| 4,366,072 A | 12/1982 | McLaughlin et al. |
| 4,366,073 A | 12/1982 | McLaughlin et al. |
| 4,366,074 A | 12/1982 | McLaughlin et al. |
| 4,374,739 A | 2/1983 | McLaughlin et al. |
| 4,393,939 A | 7/1983 | Smith et al. |
| 4,395,340 A | 7/1983 | McLaughlin |
| 4,401,789 A | 8/1983 | Gideon |
| 4,439,334 A | 3/1984 | Borchardt |
| 4,440,649 A | 4/1984 | Loftin et al. |
| 4,441,556 A | 4/1984 | Powers et al. |
| 4,447,342 A | 5/1984 | Borchardt et al. |
| 4,460,627 A | 7/1984 | Weaver et al. |
| 4,462,718 A | 7/1984 | McLaughlin et al. |
| 4,466,831 A | 8/1984 | Murphey et al. |
| 4,499,214 A | 2/1985 | Sortwell |
| 4,532,052 A | 7/1985 | Weaver et al. |
| 4,536,297 A | 8/1985 | Loftin et al. |
| 4,536,303 A | 8/1985 | Borchardt |
| 4,536,305 A | 8/1985 | Borchardt et al. |
| 4,552,670 A | 11/1985 | Lipowski et al. |
| 4,554,081 A | 11/1985 | Borchardt et al. |
| 4,563,292 A | 1/1986 | Borchardt |
| 4,604,216 A | 8/1986 | Irvin et al. |
| 4,608,139 A | 8/1986 | Craun et al. |
| 4,619,776 A | 10/1986 | Mondshine |
| 4,627,926 A | 12/1986 | Peiffer et al. |
| 4,662,448 A | 5/1987 | Ashford et al. |
| 4,670,501 A | 6/1987 | Dymond et al. |
| 4,671,883 A | 6/1987 | Connell |
| 4,693,639 A | 9/1987 | Hollenbeak et al. |
| 4,699,722 A | 10/1987 | Dymond et al. |
| 4,702,319 A | 10/1987 | Bock et al. |
| 4,730,028 A | 3/1988 | Bock et al. |
| 4,814,096 A | 3/1989 | Evani |
| 4,828,725 A | 5/1989 | Lai et al. |
| 4,828,726 A | 5/1989 | Himes et al. |
| 4,856,590 A | 8/1989 | Caillier |
| 4,870,167 A | 9/1989 | Zody et al. |
| 4,941,537 A | 7/1990 | Langemeier et al. |
| 4,956,104 A | 9/1990 | Cowan et al. |
| 4,959,432 A | 9/1990 | Fan et al. |
| 4,960,876 A | 10/1990 | Molteni et al. |
| 5,002,127 A | 3/1991 | Dalrymple et al. |
| 5,051,197 A | 9/1991 | Kalfayan et al. |
| 5,071,934 A | 12/1991 | Peiffer |
| 5,097,904 A | 3/1992 | Himes |
| 5,105,886 A | 4/1992 | Strubhar et al. |
| 5,146,986 A | 9/1992 | Dalrymple |
| 5,160,642 A | 11/1992 | Schield et al. |
| 5,197,544 A | 3/1993 | Himes |
| 5,208,216 A | 5/1993 | Williamson et al. |
| 5,244,042 A | 9/1993 | Dovan et al. |
| 5,248,665 A | 9/1993 | Hale et al. |
| 5,249,627 A | 10/1993 | Harms et al. |
| 5,256,651 A | 10/1993 | Phelps et al. |
| 5,271,466 A | 12/1993 | Harms |
| 5,335,726 A | 8/1994 | Rodrigues |
| 5,342,530 A | 8/1994 | Aften et al. |
| 5,358,051 A | 10/1994 | Rodrigues |
| 5,379,841 A | 1/1995 | Pusch et al. |
| 5,382,371 A | 1/1995 | Stahl et al. |
| 5,424,284 A | 6/1995 | Patel et al. |
| 5,445,223 A | 8/1995 | Nelson et al. |
| 5,473,059 A | 12/1995 | Yeh |
| 5,501,274 A | 3/1996 | Nguyen et al. |
| 5,582,249 A | 12/1996 | Caveny et al. |
| 5,597,783 A | 1/1997 | Audibert et al. |
| 5,607,902 A | 3/1997 | Smith et al. |
| 5,637,556 A | 6/1997 | Argillier et al. |
| 5,643,460 A | 7/1997 | Marble et al. |
| 5,646,093 A | 7/1997 | Dino |
| 5,669,456 A | 9/1997 | Audibert et al. |
| 5,681,796 A | 10/1997 | Nimerick |
| 5,697,440 A | 12/1997 | Weaver et al. |
| 5,704,426 A | 1/1998 | Rytlewski et al. |
| 5,720,347 A | 2/1998 | Audibert et al. |
| 5,728,653 A | 3/1998 | Audibert et al. |
| 5,735,349 A | 4/1998 | Dawson et al. |
| 5,775,425 A | 7/1998 | Weaver et al. |
| 5,787,986 A | 8/1998 | Weaver et al. |
| 5,833,000 A | 11/1998 | Weaver et al. |
| 5,836,392 A | 11/1998 | Urlwin-Smith |
| 5,839,510 A | 11/1998 | Weaver et al. |
| 5,853,048 A | 12/1998 | Weaver et al. |
| 5,871,049 A | 2/1999 | Weaver et al. |
| 5,887,653 A | 3/1999 | Bishop et al. |
| 5,908,073 A | 6/1999 | Nguyen et al. |
| 5,908,814 A | 6/1999 | Patel et al. |
| 5,924,488 A | 7/1999 | Nguyen et al. |
| 5,944,106 A | 8/1999 | Dalrymple et al. |
| 5,972,848 A | 10/1999 | Audibert et al. |
| 5,979,557 A | 11/1999 | Card et al. |
| 5,990,052 A | 11/1999 | Harris |
| 6,016,870 A | 1/2000 | Dewprashad et al. |
| 6,020,289 A | 2/2000 | Dymond |
| 6,047,772 A | 4/2000 | Weaver et al. |
| 6,070,664 A | 6/2000 | Dalrymple et al. |
| 6,109,350 A | 8/2000 | Nguyen et al. |

| | | |
|---|---|---|
| 6,116,342 A | 9/2000 | Clark et al. |
| 6,124,245 A | 9/2000 | Patel |
| 6,187,839 B1 | 2/2001 | Eoff et al. |
| 6,192,986 B1 | 2/2001 | Urlwin-Smith |
| 6,194,356 B1 | 2/2001 | Jones et al. |
| 6,196,317 B1 | 3/2001 | Hardy |
| 6,209,643 B1 | 4/2001 | Nguyen et al. |
| 6,209,646 B1 | 4/2001 | Reddy et al. |
| 6,213,209 B1 | 4/2001 | Nguyen et al. |
| 6,228,812 B1 | 5/2001 | Dawson et al. |
| 6,237,687 B1 | 5/2001 | Barbee, Jr. et al. |
| 6,242,390 B1 | 6/2001 | Mitchell et al. |
| 6,253,851 B1 | 7/2001 | Schroeder, Jr. et al. |
| 6,277,900 B1 | 8/2001 | Oswald et al. |
| 6,281,172 B1 | 8/2001 | Warren et al. |
| 6,283,210 B1 | 9/2001 | Soliman et al. |
| 6,291,404 B2 | 9/2001 | House |
| 6,302,207 B1 | 10/2001 | Nguyen et al. |
| 6,358,889 B2 | 3/2002 | Waggenspack et al. |
| 6,359,047 B1 | 3/2002 | Thieu et al. |
| 6,364,016 B1 | 4/2002 | Dalrymple et al. |
| 6,380,137 B1 | 4/2002 | Heier et al. |
| 6,476,169 B1 | 11/2002 | Eoff et al. |
| 6,476,283 B1 | 11/2002 | Devore et al. |
| 6,497,283 B1 | 12/2002 | Eoff et al. |
| 6,562,762 B2 | 5/2003 | Cowan et al. |
| 6,569,983 B1 | 5/2003 | Treybig et al. |
| 6,601,648 B2 | 8/2003 | Ebinger |
| 6,607,035 B1 | 8/2003 | Reddy et al. |
| 6,609,578 B2 | 8/2003 | Patel et al. |
| 6,626,241 B2 | 9/2003 | Nguyen |
| 6,627,719 B2 | 9/2003 | Whipple et al. |
| 6,637,517 B2 | 10/2003 | Samuel et al. |
| 6,656,885 B2 | 12/2003 | House et al. |
| 6,668,926 B2 | 12/2003 | Ngugen et al. |
| 6,710,107 B2 | 3/2004 | Audibert et al. |
| 6,725,931 B2 | 4/2004 | Nguyen et al. |
| 6,729,404 B2 | 5/2004 | Nguyen et al. |
| 6,739,806 B1 | 5/2004 | Szymanski et al. |
| 6,743,288 B2 | 6/2004 | Eoff et al. |
| 6,755,245 B2 | 6/2004 | Nguyen et al. |
| 6,764,981 B1 | 7/2004 | Eoff et al. |
| 6,767,867 B2 | 7/2004 | Chatterji et al. |
| 6,767,869 B2 | 7/2004 | DiLullo et al. |
| 6,776,236 B1 | 8/2004 | Nguyen |
| 6,780,822 B2 | 8/2004 | Cowan et al. |
| 6,787,506 B2 | 9/2004 | Blair et al. |
| 6,790,812 B2 | 9/2004 | Halliday et al. |
| 6,803,348 B2 | 10/2004 | Jones et al. |
| 6,832,650 B2 | 12/2004 | Nguyen et al. |
| 6,846,420 B2 | 1/2005 | Reddy et al. |
| 6,855,672 B2 | 2/2005 | Poelker et al. |
| 6,875,729 B2 | 4/2005 | Verlaan et al. |
| 6,877,560 B2 | 4/2005 | Nguyen et al. |
| 6,884,760 B1 | 4/2005 | Brand et al. |
| 6,887,834 B2 | 5/2005 | Nguyen et al. |
| 6,892,813 B2 | 5/2005 | Nguyen et al. |
| 6,962,200 B2 | 11/2005 | Nguyen et al. |
| 6,962,203 B2 | 11/2005 | Funchess |
| 6,978,836 B2 * | 12/2005 | Nguyen et al. ............... 166/295 |
| 6,981,552 B2 | 1/2006 | Reddy et al. |
| 7,007,752 B2 | 3/2006 | Reddy et al. |
| 7,008,908 B2 | 3/2006 | Chan et al. |
| 7,013,976 B2 | 3/2006 | Nguyen et al. |
| 7,017,665 B2 | 3/2006 | Nguyen |
| 7,021,379 B2 | 4/2006 | Nguyen |
| 7,028,774 B2 | 4/2006 | Nguyen et al. |
| 7,036,587 B2 | 5/2006 | Munoz, Jr. et al. |
| 7,036,589 B2 | 5/2006 | Nguyen |
| 7,040,403 B2 | 5/2006 | Nguyen et al. |
| 7,063,150 B2 | 6/2006 | Slabaugh et al. |
| 7,063,151 B2 | 6/2006 | Nguyen et al. |
| 7,081,439 B2 | 7/2006 | Sullivan et al. |
| 7,091,159 B2 | 8/2006 | Eoff et al. |
| 7,104,325 B2 | 9/2006 | Nguyen et al. |
| 7,114,560 B2 | 10/2006 | Nguyen et al. |
| 7,114,568 B2 | 10/2006 | Eoff et al. |
| 7,114,570 B2 | 10/2006 | Nguyen et al. |
| 7,117,942 B2 | 10/2006 | Dalrymple et al. |
| 7,128,148 B2 | 10/2006 | Eoff et al. |
| 7,131,491 B2 | 11/2006 | Blauch et al. |
| 7,159,656 B2 | 1/2007 | Eoff et al. |
| 7,182,136 B2 | 2/2007 | Dalrymple et al. |
| 7,207,387 B2 | 4/2007 | Eoff et al. |
| 7,216,707 B2 | 5/2007 | Eoff et al. |
| 7,220,708 B2 | 5/2007 | Zamora et al. |
| 7,273,099 B2 | 9/2007 | East, Jr. et al. |
| 7,398,825 B2 | 7/2008 | Nguyen, et al. |
| 7,563,750 B2 * | 7/2009 | Eoff et al. ............... 507/212 |
| 2003/0013871 A1 | 1/2003 | Mallon et al. |
| 2003/0104948 A1 | 6/2003 | Poelker et al. |
| 2003/0114317 A1 | 6/2003 | Benton et al. |
| 2003/0191030 A1 | 10/2003 | Blair et al. |
| 2004/0171495 A1 | 9/2004 | Zamora et al. |
| 2004/0220058 A1 | 11/2004 | Eoff et al. |
| 2004/0229756 A1 * | 11/2004 | Eoff et al. ............... 507/219 |
| 2004/0229757 A1 | 11/2004 | Eoff et al. |
| 2005/0092489 A1 | 5/2005 | Welton et al. |
| 2005/0155796 A1 | 7/2005 | Eoff et al. |
| 2005/0164894 A1 * | 7/2005 | Eoff et al. ............... 507/200 |
| 2005/0194135 A1 | 9/2005 | Nguyen et al. |
| 2005/0194140 A1 * | 9/2005 | Dalrymple et al. .......... 166/279 |
| 2005/0199396 A1 | 9/2005 | Sierra et al. |
| 2005/0230111 A1 | 10/2005 | Nguyen et al. |
| 2005/0230114 A1 * | 10/2005 | Eoff et al. ............... 166/295 |
| 2005/0230116 A1 | 10/2005 | Eoff et al. |
| 2005/0257929 A1 | 11/2005 | Nguyen et al. |
| 2005/0277554 A1 | 12/2005 | Blauch et al. |
| 2005/0282973 A1 | 12/2005 | Nguyen et al. |
| 2005/0284632 A1 * | 12/2005 | Dalrymple et al. .......... 166/278 |
| 2006/0016596 A1 | 1/2006 | Pauls et al. |
| 2006/0124309 A1 | 6/2006 | Nguyen et al. |
| 2006/0137875 A1 | 6/2006 | Dusterhoft et al. |
| 2006/0219405 A1 | 10/2006 | Nguyen et al. |
| 2006/0219408 A1 | 10/2006 | Nguyen et al. |
| 2006/0234874 A1 | 10/2006 | Eoff et al. |
| 2006/0240994 A1 | 10/2006 | Eoff et al. |
| 2006/0240995 A1 | 10/2006 | Rickman et al. |
| 2006/0266522 A1 | 11/2006 | Eoff et al. |
| 2006/0283592 A1 | 12/2006 | Sierra et al. |
| 2007/0012445 A1 | 1/2007 | Nguyen et al. |
| 2007/0029087 A1 | 2/2007 | Nguyen et al. |
| 2007/0114032 A1 | 5/2007 | Stegent et al. |
| 2008/0070805 A1 | 3/2008 | Munoz et al. |
| 2008/0070807 A1 | 3/2008 | Munoz et al. |
| 2008/0070808 A1 | 3/2008 | Munoz et al. |
| 2008/0110624 A1 | 5/2008 | Nguyen et al. |
| 2008/0139411 A1 | 6/2008 | Harris et al. |
| 2008/0196897 A1 | 8/2008 | Nguyen |

FOREIGN PATENT DOCUMENTS

| | | |
|---|---|---|
| EP | 0 896 122 A2 | 2/1999 |
| EP | 1 193 365 A1 | 4/2002 |
| EP | 1 312 753 A1 | 5/2003 |
| GB | 2 221 940 A | 2/1990 |
| GB | 2 335 428 A | 9/1999 |
| WO | WO 93/15164 | 8/1993 |
| WO | WO 99/49183 | 9/1999 |
| WO | WO 99/50530 | 10/1999 |
| WO | WO 00/78890 | 12/2000 |
| WO | WO 02/097236 A1 | 12/2002 |
| WO | WO 03/056130 | 7/2003 |
| WO | WO 2004/022667 A | 3/2004 |
| WO | WO 2004/094781 | 11/2004 |

WO    WO 2004/101706 A1    11/2004

OTHER PUBLICATIONS

Eoff, Larry, et al, *Structure and Process Optimization for the Use of a Polymeric Relative-Permeability Modifier in Conformance Control*, SPE eLibrary Paper No. 64985, 2001, Society of Petroleum Engineers, Inc., presented at SPE International Symposium on Oilfield Chemistry, Houston, TX, Feb. 13-16, pp. 1-2.

Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.

Zhou, Z. J., et al, *Controlling Formation Damage Using Clay Stabilizers: A Review*, Paper 95-71, The Petroleum Society of CIM, 1995, presented at the 46$^{th}$ Annual Technical Meeting of the Petroleum Society of CIM in Banff, Alberta, Canada, May 14-17.

Halliburton, 2001 Press Releases, *Halliburton Technology Uses Revolutionary Polymer System to Control Unwanted Water Production*, 2002 Halliburton, pp. 1-2.

Halliburton, 2001 Press Releases, *First Halliburton H2Zero™ Conformance Solution Job Performed for a Producing Well in Egypt*, 2002 Halliburton, pp. 1-2.

Halliburton, 2001 Press Releases, *Halliburton Performs First H2Zero™ Conformance Solution Job in North America*, 2002 Halliburton, pp. 1-2, printed from website @ www.halliburton.com/news/archive/2001/esgnws_082201.jsp.

BJ Services Company, *Aquacon, Product Information*, Aug. 1, 2001, pp. 1-2.

BJ Services Company, *Aquatrol I, Product Information*, Dec. 14, 2000, pp. 1-2.

Proett, et al., *Advanced Dual Probe Formation Tester with Transient, Harmonic, and Pulsed Time-Delay Testing Methods Determines Permeability, Skin, and Anisotropy*, SPE 64650, 2000, Society of Petroleum Engineers Inc., presented at the SPE International Oil and Gas Conference and Exhibition in China held in Beijing, China, Nov. 7-10, 2000.

Proett, et al., *Advanced Permeability and Anisotropy Measurements While Testing and Sampling in Real-time Using a Dual Probe Formation Tester*, SPE 62919, 2000, Society of Petroleum Engineers Inc., presented at the 2000 SPE Annual Technical Conference and Exhibition held in Dallas, Texas, Oct. 1-4, 2000.

Bai, et al., *Improved Determination of Stress-Dependent Permeability for Anisotropic Formations*, SPE/ISRM 78188, 2000, Society of Petroleum Engineers Inc., presented at the SPE/ISRM Rock Mechanics Conference held in Irving, Texas, Oct. 20-23, 2002.

Parker, et al., *Laser Drilling: Effects of Beam Application Methods on Improving Rock Removal*, SPE 84353, 2003, Society of Petroleum Engineers Inc., presented at the SPE Annual Technical Conference and Exhibition held in Denver, Colorado, Oct. 5-8, 2003, printed from website @ http://speonline.spe.org.

Xu, et al., *Modeling of Laser Spallation Drilling of Rocks for Gas—and Oilwell Drilling*, SPE 95746, 2005, Society of Petroleum Engineers Inc., presented at the 2005 SPE Annual Technical Conference and Exhibition held in Dallas, Texas, Oct. 9-12, 2005, printed from website @ http://speonline.spe.org.

Batarseh, et al., *Well Perforation Using High-Power Lasers*, SPE 84418, 2003, Society of Petroleum Engineers Inc., presented at the SPE Annual Technical Conference and Exhibition held in Denver, Colorado, Oct. 5-8, 2003, printed from website @ http://speonline.spe.org.

Gahan, et al., *Analysis of Efficient High-Power Fiber Lasers for Well Perforation*, SPE 90661, 2004, Society of Petroleum Engineers Inc., presented at the SPEe Annual Technical Conference and Exhibition held in Houston, Texas, Sep. 26-29, 2004, printed from website @ http://speonline.spe.org.

Gahan, et al., *Effect of Downhole Pressure Conditions on High-Power Laser Perforation*, SPE 97093, 2005, Society of Petroleum Engineers, presented at the 2005 SPE Annual Technical Conference and Exhibition held in Dallas, Texas, Oct. 9-12, 2005, printed from website @ http://speonline.spe.org.

U.S. Appl. No. 12/080,647, filed Apr. 4, 2008.
Office Action for U.S. Appl. No. 12/080,647, dated Dec. 24, 2008.
Office Action for U.S. Appl. No. 12/080,647, dated Jun. 24, 2009.

\* cited by examiner

METHODS FOR TREATING INTERVALS OF A SUBTERRANEAN FORMATION HAVING VARIABLE PERMEABILITY

BACKGROUND

The present invention relates to methods for treating a subterranean formation. More particularly, the present invention relates to methods of using water-soluble hydrophobically modified polymers to treat intervals of a subterranean formation having variable permeabilities.

In subterranean treatments, it is often desired to treat an interval of a subterranean formation having sections of nonuniform permeability. However, due to the interval's variable permeability, it may be difficult to obtain a uniform distribution of the treatment fluid throughout the entire interval. For instance, the treatment fluid may preferentially enter portions of the interval with high permeability at the expense of portions of the interval with lesser permeability. In some instances, these intervals with variable permeability may be water-producing intervals. In other instances, these intervals with variable permeability may be weakly consolidated intervals. As used in this disclosure, the phrase "weakly consolidated interval" includes one or more portions of a subterranean formation that contain loose particulates and particulates bonded with insufficient bond strength to withstand the forces created by the production (or injection) of fluids through the formation. These particulates may include, among other things, sand, gravel, fines and/or proppant in the subterranean formation, for example, proppant placed in the subterranean formation in the course of a fracturing or gravel-packing operation. A weakly consolidated interval may include fractures in the formation wherein weakly consolidated particulates reside within the open space of the fracture, e.g., a proppant pack.

In an attempt to facilitate the uniform distribution of treatment fluids throughout the entire interval, a variety of techniques have been used to divert treatment fluids to less permeable portions of the interval. Such techniques have involved, among other things, the injection of particulates, foams, or blocking polymers (e.g., crosslinked aqueous gels) into the interval so as to plug off the high-permeability portions of the subterranean formation, thereby diverting subsequently injected fluids to less permeable portions of the subterranean formation. While each of these diversion techniques has been used successfully, there may be disadvantages. In some instances, plugging off the high-permeability sections may not be suitable for a producing interval, for example, because the injected solution (or material) may reduce or stop the flow of hydrocarbons in addition to the achieving a desired diversion of the treatment fluid. Therefore, to return the interval to production, expensive and/or time-consuming remedial treatments may be required to remove the injected solutions (or materials). Furthermore, techniques geared toward injecting solutions (or materials) designed to plug off high-permeability intervals of the formation may require expensive zonal isolation, which may be inaccurate, leading to inadvertent plugging of and/or damage to the hydrocarbon-bearing sections.

SUMMARY

The present invention relates to methods for treating a subterranean formation. More particularly, the present invention relates to methods of using water-soluble hydrophobically modified polymers to treat intervals of a subterranean formation having variable permeabilities.

An exemplary embodiment of the present invention provides a method of treating an interval of a subterranean formation having a permeability that varies. The method comprises contacting the interval with a water-soluble hydrophobically modified polymer capable of selectively reducing the effective permeability of the interval to water without a comparable reduction of the effective permeability of the interval to hydrocarbons. The hydrophobically modified polymer modifies the interval to have a more uniform permeability without substantially preventing the flow of fluids through the interval. The method further comprises introducing a treatment fluid into the interval. The more uniform permeability of the interval allows for a more uniform treatment of the interval by the treatment fluid than would be allowed without treatment of the interval with the hydrophobically modified polymer.

Another exemplary embodiment of the present invention provides a method of treating a water-producing interval of a subterranean formation, the water-producing interval penetrated by a well bore. The method comprises contacting a near well bore portion of the water-producing interval with a water-soluble hydrophobically modified polymer capable of selectively reducing the effective permeability of the water-producing interval to water without a comparable reduction of the effective permeability of the water-producing interval to hydrocarbons. The hydrophobically modified polymer modifies the water-producing interval to have a more uniform permeability without substantially preventing the flow of fluids through the water-producing interval. The method further comprises introducing a consolidating fluid into the water-producing interval to reduce the production of water from the water-producing interval. The more uniform permeability of the water-producing interval allows for a more uniform treatment of the water-producing interval by the consolidating fluid than would be allowed without treatment of the water-producing interval with the hydrophobically modified polymer.

Another exemplary embodiment of the present invention provides a method of treating a weakly consolidated interval of a subterranean formation, the weakly consolidated interval penetrated by a well bore, the method comprising contacting a near well bore portion of the weakly consolidated interval with a water-soluble hydrophobically modified polymer capable of selectively reducing the effective permeability of the weakly consolidated interval to water without a comparable reduction of the effective permeability of the weakly consolidated interval to hydrocarbons. The hydrophobically modified polymer modifies the weakly consolidated interval to have a more uniform permeability without substantially preventing the flow of fluids through the weakly consolidated interval. The method further comprises introducing a consolidating fluid into the weakly consolidated interval to reduce fines migration in the weakly consolidated interval. The more uniform permeability of the weakly consolidated interval allows for a more uniform treatment of the weakly consolidated interval by the consolidating fluid than would be allowed without treatment of the weakly consolidated interval with the hydrophobically modified polymer The features and advantages of the present invention will be apparent to those skilled in the art upon reading the following description of specific embodiments with reference to the accompanying drawings.

DRAWINGS

DETAILED DESCRIPTION OF SPECIFIC EMBODIMENTS

The present technique relates to using water-soluble hydrophobically modified polymers to treat intervals of a subterranean formation having variable permeabilities. In general, the hydrophobically modified polymers should be used to modify the interval to have a more uniform effective permeability than prior to the treatment. Modification of the interval to have a more uniform effective permeability should facilitate uniform treatment of the interval. For example, as the interval has been modified to have a more uniform effective permeability, a more uniform distribution of treatment fluids introduced into the interval should be obtained than would otherwise be achieved without this permeability modification. Otherwise, the treatment fluid may preferentially enter portions of the interval with high permeability at the expense of portions of the interval with lesser permeability. As desired, the present technique's use of the hydrophobically modified polymers generally may alleviate the necessity of introducing particulates, foams, and/or blocking polymers into the interval that otherwise may be necessary to achieve this uniform treatment.

I. Exemplary Methods—Treatment of Formation Interval

Figure 1:
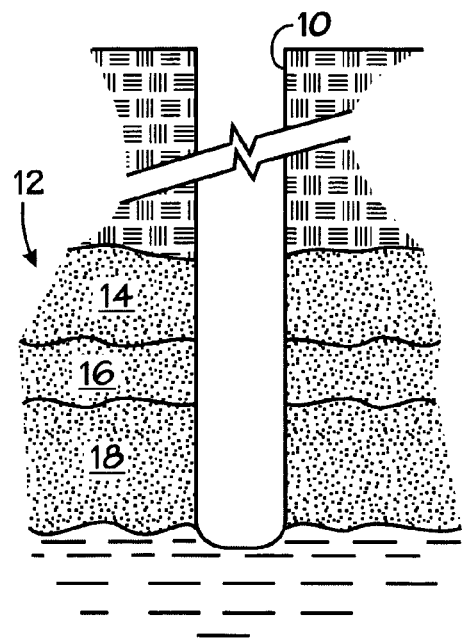
FIG. 1 is a cross-sectional, side view of a well bore penetrating an interval of a subterranean formation.

Turning to the drawings and referring first to FIG. 1, a well bore 10 is shown that penetrates an interval 12 of a subterranean formation. Even though FIG. 1 depicts the well bore 10 as a vertical well bore, the methods of the present invention may be suitable for use in generally horizontal, generally vertical, or otherwise formed portions of wells. Moreover, as those of ordinary skill in the art will appreciate, the present technique is applicable for the treatment of both production and injection wells. Additionally, while the well bore 10 is illustrated as an openhole well bore, the present technique also may be suitable for cased well bores. Furthermore, the interval 12 may be any interval of a subterranean formation suitable for treatment. For example, the interval 12 may be a water-producing and/or a weakly consolidated interval of a subterranean formation. It should be noted that the techniques described herein are suitable for production well, as well as injection wells.

The interval 12 has a permeability that varies. As those of ordinary skill in the art will appreciate, intervals of a subterranean formation often have multiple portions along the well bore of varying permeability. For example, a water-producing portion of the interval 12 may have a higher permeability than other portions of the interval 12. As will be appreciated, permeability is generally a function of formation sand particle size, porosity of the matrix, and consolidation strength of formation sand. By way of example, formations with large particle sand size, high porosity, and low consolidation strength often have higher permeability than those with small particle sand size, low porosity, and high consolidation strength. As illustrated, the interval 12 includes multiple portions along the well bore 10, including a first portion 14, a second portion 16, and a third portion 18. Each portion of the interval may have a different effective permeability. It should be noted that, while FIG. 1 illustrates the interval 12 as having three portions along the well bore 10 with different effective permeabilities, the present technique may be applied to any interval of a subterranean formation having an effective permeability that varies one area to another.

Figure 2:
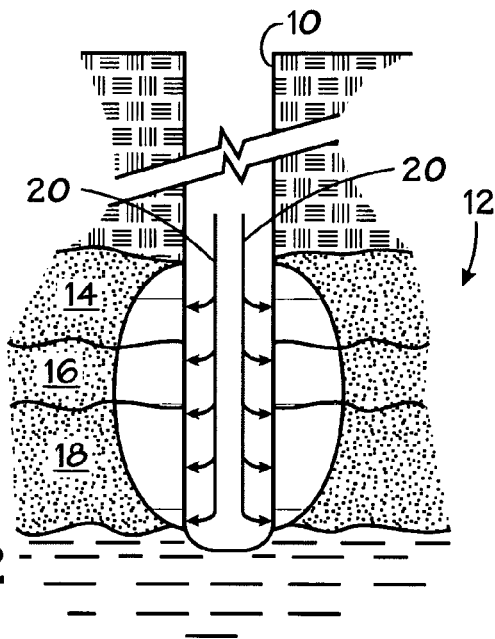
FIG. 2 is a cross-sectional, side view of a well bore penetrating an interval of a subterranean formation showing the introduction of a fluid comprising a relative permeability modifier into the well bore of FIG. 1.

Referring now to FIG. 2, in accordance with the present technique, the interval 12 may be contacted with a hydrophobically modified polymer. In some exemplary embodiments, for contacting the interval 12 with the hydrophobically modified polymer, the hydrophobically modified polymer may be present in a permeability modifying fluid 20 introduced into the interval 12. Treatment fluids comprising the hydrophobically modified polymer will be referred to herein as "permeability modifying fluids." In some embodiments, the near well bore portion of the interval 12 is contacted with the hydrophobically modified polymer. Those of ordinary skill in the art will understand that the "near well bore portion" of a formation generally refers to the portion of a subterranean formation surrounding a well bore. For example, the "near well bore portion" may refer to the portion of the formation surrounding a well bore and having a depth of penetration of from about 1 to about 3 well bore diameters.

In general, the hydrophobically modified polymer should modify the permeability of the interval 12 to be more uniform. It is believed that the hydrophobically modified polymer should attach to surfaces of particulates within the interval 12 of the formation, thereby selectively reducing the effective permeability of the interval 12 to water without a comparable reduction of the formation's permeability to hydrocarbons. Accordingly, the effective permeability of the interval 12 of the formation to water may be modified to be generally uniform. In addition, the hydrophobically modified polymer also may be used to modify the effective permeability of the formation to hydrocarbons to be generally uniform as well. While, in general, the hydrophobically modified polymer selectively reduces the formation's permeability to water, those of ordinary skill in the art will appreciate that sufficient concentrations of the hydrophobically modified polymer may be introduced into the interval 12 of the formation to modify the effective permeability of the interval 12 to hydrocarbons to be more uniform. In certain embodiments, the permeability of the interval 12 may vary up to about 40% after treatment with the hydrophobically modified polymer. In certain embodiments, the contact of the interval 12 with the hydrophobically modified polymer should be controlled so that the flow of fluids (e.g., aqueous fluids) through the interval 12 is not substantially prevented after the treatment with the hydrophobically modified polymer. In certain embodiments, to allow for subsequent treatments with chemical agents (e.g., aqueous consolidating agents), the effective permeability of the interval to water should be at least about 1% to about 30% of its pre-treatment permeability. Hydrophobically modified polymers suitable for use with the present technique are described in more detail below.

By way of example, prior to being contacted with the hydrophobically modified polymer, the first portion 14 may have a water permeability of 5,000 mD; the second portion 16 may have a water permeability of 200 mD; and the third portion 18 may have a water permeability of 1,000 mD. After treatment with the hydrophobically modified polymer, the water permeability of the first portion 14, the second portion 16, and the third portion 18 should be more uniform. For example, after being contacted with the hydrophobically modified polymer, the first portion 14, second portion 16, and third portion 18 may have an effective permeability to water of about 150 mD. It should be noted that, in certain embodiments, to achieve a more uniform effective permeability to water, the entire interval 12 along the well bore 10 need not be contacted with the hydrophobically modified polymer. For example, the first portion 14 and the third portion 18 may be treated to modify the permeability thereof to be about the permeability of the second portion 16.

Any suitable technique may be used for introduction of the permeability modifying fluid 20 into the interval 12, for example, bull heading, coil tubing, jointed pipe (e.g., with straddle packers, pinpoint injection tools, etc.) or any other suitable technique may be used. It should be noted that, to reduce the potential for the undesired fracturing of the interval 12, the permeability modifying fluid 20 should be introduced into the interval 12 at matrix flow rates. Example flow rates for the permeability modifying fluid 20 are in the range of from about 0.25 barrels to about 3 barrels per minute. However, those of ordinary skill in the art will appreciate that these flow rates are merely examples, and the present technique is applicable to flow rates outside these ranges. Further, as discussed previously, contacting the interval 12 with the hydrophobically modified polymer should be controlled so that the effective permeability of the interval 12 is not undesirably reduced. For example, the pressure of the permeability modifying fluid 20 may be monitored as it is being introduced into the interval 12. As the effective permeability to water of the interval 12 decreases, due to the hydrophobically modified polymer, there should be an increase in the pressure of the permeability modifying fluid 20. Therefore, this pressure may be monitored so that the permeability of the interval 12 is not undesirably reduced to allow for the subsequent treatment of the interval 12. Other suitable techniques for monitoring the permeability of the interval 12 also may be utilized.

Figure 3:
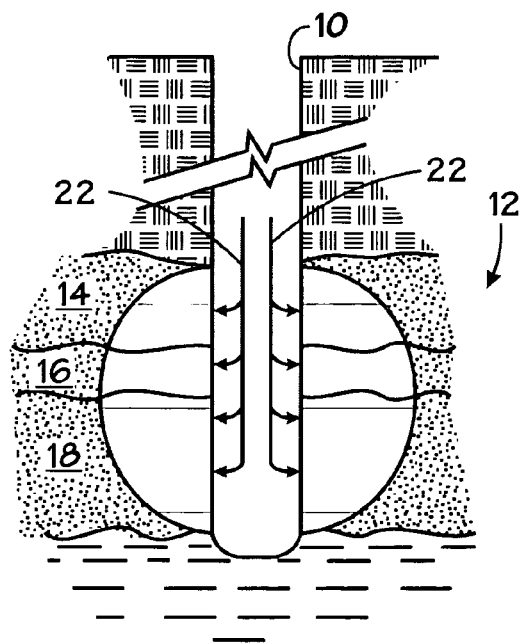
FIG. 3 is a cross-sectional, side view of a well bore penetrating an interval of a subterranean formation showing the introduction of an aqueous treatment fluid into the well bore of FIG. 1.

Referring now to FIG. 3, after the interval 12 has been contacted with the hydrophobically modified polymer, a treatment fluid 22 may be introduced into the interval 12. As the hydrophobically modified polymer has modified the interval 12 to have a more uniform permeability, a more uniform distribution of the treatment fluid 22 should be obtained than would otherwise be achieved without the permeability modification described above with reference to FIG. 2. As such, a uniform treatment of the interval 12 by the treatment fluid 22 may be obtained, in that the treatment fluid 22 should generally not undesirably enter portions of the interval 12 with high permeability at the expense of portions of the interval 12 with lesser permeability. Examples of suitable treatment fluids will be described in more detail below.

Any suitable technique may be used for introduction of the aqueous treatment fluid 22 into the interval 12 of the subterranean formation, for example, bull heading, coiled tubing, jointed pipe (e.g., with straddle packers, pinpoint injection tools, etc.) or any other suitable technique may be used. It should be noted that, to reduce the potential for the undesired fracturing of the interval 12, the treatment fluid 22 should be introduced into the interval 12 at matrix flow rates. Example flow rates for the treatment fluid 22 are in the range of from about 0.25 barrels to about 3 barrels per minute. However, those of ordinary skill in the art will appreciate that these flow rates are merely examples, and the present technique is applicable to flow rates outside these ranges.

Additionally, the treatment fluid 22 should achieve sufficient penetration into the interval 12 for the particular application. In the illustrated embodiment, the treatment fluid 22 penetrates further into the interval 12 than the permeability modifying fluid 20. This deeper penetration of the treatment fluid 22 may be desired, for example, where the control of water production from the interval 12 is desired. However, as those of ordinary skill in the art will appreciate, the depth of penetration of the treatment fluid 22 into the interval 12 will vary based on the particular application. For example, the treatment fluid 22 may have the same penetration, or even less penetration, than the permeability modifying fluid 20.

Optionally, an oxidizer may be introduced into the interval 12, after contacting the interval with the hydrophobically modified polymer, to restore the original permeability to the interval 12. In general, the oxidizer should substantially remove the hydrophobically modified polymer from the surfaces within the interval 12. An oxidizer may be used, for example, where the hydrophobically modified polymer has undesirably reduced the permeability, such as by inadvertently preventing the subsequent introduction of treatment fluids into the interval 12.

While specific reference is made in the above discussion to sequential treatment of the interval 12 with the hydrophobically modified polymer followed by treatment with the treatment fluid 22, it should be appreciated that this invention is not limited to such sequential treatments. By way of example, the present technique also encompasses treatment of the interval 12 with a treatment fluid 22 that comprises the hydrophobically modified polymer. In such a treatment, the hydrophobically modified polymer present in the treatment fluid 22 should modify the permeability of the interval 12 to be more uniform. Because the interval 12 is modified to have a more uniform permeability, a more uniform distribution of the treatment fluid 22 should be obtained than would otherwise be achieved without this permeability modification. As such, a uniform treatment of the interval 12 by the treatment fluid 22 may be obtained, in that the treatment fluid 22 should generally not undesirably enter portions of the interval 12 with high permeability at the expense of portions of the interval 12 with lesser permeability.

II. Exemplary Hydrophobically Modified Polymers

The hydrophobically modified polymers suitable for use in exemplary embodiments of the present technique should be capable of selectively reducing the effective permeability of a subterranean formation to water without a comparable reduction of the formation's effective permeability to hydrocarbons. As used in this disclosure, the phrase "hydrophobically modified," or "hydrophobic modification," or any variation thereof, refers to the incorporation into the hydrophilic polymer structure of hydrophobic groups, wherein the alkyl chain length is from about 4 to about 22 carbons.

The hydrophobically modified polymers useful in exemplary embodiments of the present technique typically have molecular weights in the range of from about 100,000 to about 10,000,000. While these hydrophobically modified polymers have hydrophobic groups incorporated into the hydrophilic polymer structure, they should remain water-soluble. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone that comprises polar heteroatoms. Generally, the polar heteroatoms present within the polymer backbone of the hydrophobically modified polymers include, but are not limited to, oxygen, nitrogen, sulfur, or phosphorous.

The hydrophobically modified polymers may be synthesized utilizing any suitable technique. In one example, the hydrophobically modified polymers may be a reaction product of a hydrophilic polymer and a hydrophobic compound. In another example, the hydrophobically modified polymers may be prepared from a polymerization reaction comprising a hydrophilic monomer and a hydrophobically modified hydrophilic monomer. In general, the hydrophobically modified polymers may be pre-reacted before they are placed into the well bore 10. Alternatively, in certain embodiments, the hydrophobically modified polymers may be prepared by an appropriate in situ reaction. The preparation of suitable hydrophobically modified polymers is described in more detail in U.S. Pat. No. 6,476,169 and U.S. Pat. Pub. Nos. 2005/0194140 and 2005/0164894, the contents of which are hereby incorporated by reference as if fully set forth herein. Those of ordinary skill in the art, with the benefit of this disclosure, will be able to determine other suitable methods for the synthesis of suitable hydrophobically modified polymers.

In certain exemplary embodiments of the present technique, suitable hydrophobically modified polymers may be synthesized by the hydrophobic modification of a hydrophilic polymer. The hydrophilic polymers suitable for forming the hydrophobically modified polymers used in the present technique should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), alkyl acrylate polymers in general, and derivatives thereof. Additional examples of alkyl acrylate polymers include, but are not limited to, polydimethylaminoethyl methacrylate, poly-dimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), and poly(methacrylic acid/dimethylaminopropyl methacrylamide). In certain exemplary embodiments, the hydrophilic polymers comprise a polymer backbone and reactive amino groups in the polymer backbone or as pendant groups, the reactive amino groups capable of reacting with hydrophobic compounds. In some exemplary embodiments, the hydrophilic polymers comprise dialkyl amino pendant groups. In some exemplary embodiments, the hydrophilic polymers comprise a dimethyl amino pendant group and a monomer comprising dimethylaminoethyl methacrylate or dimethylaminopropyl methacrylamide. In certain exemplary embodiments, the hydrophilic polymers comprise a polymer backbone that comprises polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one exemplary embodiment, the starch is a cationic starch. A suitable cationic starch may be formed by reacting a starch, such as corn, maize, waxy maize, potato, and tapioca, and the like, with the reaction product of epichlorohydrin and trialkylamine.

The hydrophobic compounds that are capable of reacting with the hydrophilic polymers include, but are not limited to, alkyl halides, sulfonates, sulfates, organic acids, and organic acid derivatives. Examples of suitable organic acids and derivatives thereof include, but are not limited to, octenyl succinic acid; dodecenyl succinic acid; and anhydrides, esters, imides, and amides of octenyl succinic acid or dodecenyl succinic acid. In certain exemplary embodiments, the hydrophobic compounds may have an alkyl chain length of from about 4 to about 22 carbons. In another exemplary embodiment, the hydrophobic compounds may have an alkyl chain length of from about 7 to about 22 carbons. In another exemplary embodiment, the hydrophobic compounds may have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

As previously mentioned, in certain exemplary embodiments, suitable hydrophobically modified polymers also may be prepared from a polymerization reaction comprising a hydrophilic monomer and a hydrophobically modified hydrophilic monomer. The hydrophobically modified polymers synthesized from the polymerization reactions may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10.

A variety of hydrophilic monomers may be used to form the hydrophobically modified polymers useful in the present technique. Examples of suitable hydrophilic monomers include, but are not limited to acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid.

A variety of hydrophobically modified hydrophilic monomers also may be used to form the hydrophobically modified polymers useful in exemplary embodiments of the present technique. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In another exemplary embodiment, the alkyl groups have from about 7 to about 22 carbons. In another exemplary embodiment, the alkyl groups have from about 12 to about 18 carbons. In certain exemplary embodiments, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylamide.

Suitable hydrophobically modified polymers that may be formed from the above-described reactions include, but are not limited to, acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, and acrylamide/2-acrylamido-2-methyl propane sulfonic acid/2-ethylhexyl methacrylate terpolymer. Another suitable hydrophobically modified polymer formed from the above-described reaction comprises an amino methacrylate/alkyl amino methacrylate copolymer. A suitable dimethlyaminoethyl methacrylate/alkyl-dimethylammoniumethyl methacrylate copolymer is a dimethylaminoethyl methacrylate/hexadecyl-dimethylammoniumethyl methacrylate copolymer. As previously discussed, these copolymers may be formed by reactions with a variety of alkyl halides. For example, in some exemplary embodiments, the hydrophobically modified polymer may comprise a dimethylaminoethyl methacrylate/hexadecyl-dimethylammoniumethyl methacrylate bromide copolymer.

III. Exemplary Permeability Modifying Fluids

In accordance with an exemplary embodiment of the present technique, the hydrophobically modified polymer may be present in a fluid, referred to herein as a "permeability modifying fluid," introduced into the interval 12. Sufficient concentrations of the hydrophobically modified polymer should be present in these permeability modifying fluids to provide the desired level of permeability modification. In some exemplary embodiments, the hydrophobically modified polymer may be present in these permeability modifying fluids in an amount in the range of from about 0.02% to about 10% by weight of the permeability modifying fluid. In another exemplary embodiment, hydrophobically modified polymer may be present in these permeability modifying fluids in an amount in the range of from about 0.05% to about 1.0% by weight of the permeability modifying fluid. In certain exemplary embodiments, the hydrophobically modified polymer may be provided in a concentrated aqueous solution prior to its combination with the other components necessary to form the permeability modifying fluids.

In addition to the hydrophobically modified polymer, the permeability modifying fluids generally also comprise water. The water included in the permeability modifying fluid may include freshwater, saltwater (e.g., natural or produced brines), and seawater. Generally, the water may be from any source, provided that it does not contain components that may undesirably interact with other components in the permeability modifying fluid.

IV. Exemplary Treatment Fluids

The treatment fluids used in exemplary embodiments of the present technique may include any fluids suitable for treating the interval 12 of the subterranean formation that, in the absence of the above-described permeability modification, would typically enter portions of the interval 12 with higher permeabilities at the expense of portion of the interval 12 with lesser permeabilities. Those of a wide variety of treatment fluids may be suitable, including, for example, fluids used in stimulation treatments (e.g., acidizing, fracturing), conformance treatments, sand control treatments, scale control treatments, corrosion control treatments, combinations thereof, and the like. In some exemplary embodiments, the treatments fluid may comprise the hydrophobically modified polymers.

By way of example, consolidating fluids may be used in conformance and/or sand control treatments. As used in this disclosure, the term "consolidating fluid" refers to a composition that enhances the grain-to-grain (or grain-to-formation) contact between particulates in a portion of a subterranean formation so that the particulates are stabilized, locked in place, or at least partially immobilized such that they are resistant to flowing with produced or injected fluids. In addition, where desired for conformance treatment, the consolidating fluid may be introduce into the interval 12 so that it forms a plug in the interval 12 thereby substantially decreasing, or even completely blocking, the flow of water. When placed into the interval 12, the consolidating fluid should inhibit the dislodged fines from migrating with any subsequently produced or injected fluids. Examples of suitable consolidating fluids include tackifying fluids, resin compositions, and gelable compositions.

It should be noted that, after placement of the consolidating fluid into the interval 12, the well bore 10 optionally may be shut in for a period of time. The shutting in of the well bore 10 for a period of time may, inter alia, enhance the coating of the consolidating fluid (e.g., the tackifying agent) onto the particulates and minimize the washing away of the consolidating fluid during later subterranean operations. The necessary shut in time period is dependent, among other things, on the composition of the consolidating fluid agent used and the temperature of the formation. Generally, the chosen period of time will be between about 0.5 hours and about 72 hours or longer. Determining the proper period of time to shut in the formation is within the ability of one skilled in the art with the benefit of this disclosure.

In some exemplary embodiments, introduction of the consolidating fluid into the interval 12 of the subterranean formation may result in diminishing the permeability of the interval 12. Reduction in permeability due to the consolidating agent is based on a variety of factors, including the particular consolidating fluid used, the viscosity of the consolidating agent, the volume of the consolidating fluid, volume of after-flush treatment fluid, and the pumpability of the formation. This reduction in permeability may be desired, for example, to reduce the flow of undesirable fluids (such as water) through the interval. However, in some exemplary embodiments, so that fluids may be produced from, and/or injected through, the interval 12, it may be desired to restore permeability to the interval 12 after this treatment. In certain exemplary embodiments, fracturing the interval 12 of the formation may be required to reconnect the well bore 10 with portions of the formation (e.g., the reservoir formation) outside the interval 12 treated with the consolidating fluid. In other exemplary embodiments, an after-flush fluid may be used to restore permeability to the interval 12. When used, the after-flush fluid is preferably placed into the interval 12 while the consolidating fluid is still in a flowing state. Among other things, the after-flush fluid generally acts to displace at least a portion of the consolidating fluid from flow paths in the interval 12 and to force the displaced portion of the consolidating fluid further into the formation where it may have negligible impact on subsequent production. However, sufficient amounts of the consolidating fluid should remain in the treated portion of the interval 12 to provide effective stabilization of the weakly consolidated portions of the subterranean formation therein. Generally, the after-flush fluid may be any fluid that does not adversely react with the other components used in accordance an exemplary embodiment of the present invention or with the subterranean formation. For example, the after-flush may be an aqueous-based brine, a hydrocarbon fluid (such as kerosene, diesel, or crude oil), or a gas (such as nitrogen or carbon dioxide). Alternatively, or in addition to the after-flush fluid, a fracturing step may be used to reconnect the well bore 10 with portions of the formation outside the interval 12.

A. Exemplary Tackifying Fluids

As previously mentioned, an exemplary embodiment of the treatment fluids used in the present technique may comprise a tackifying agent. Tackifying agents may be included in treatments fluids in sand control treatments for fines migration control. Suitable tackifying agents are substances that are (or may be activated to become) tacky and, thus, impart a degree of consolidation to unconsolidated particulates in the subterranean formation. In this manner, the particulates may be stabilized, locked in place, or at least partially immobilized such that they are resistant to flowing with fluids produced or injected into the interval. Suitable tackifying agents may not be significantly tacky when placed into the interval 12, but are capable of being "activated" (that is destabilized, coalesced and/or reacted) to transform into a tacky compound at a desirable time. Such activation may occur before, during, or after the tackifying agent is placed in the subterranean formation.

One type of tackifying agent suitable for use includes a non-aqueous tackifying agent. An example of a suitable non-aqueous tackifying agent comprises polyamides that are liquids or in solution at the temperature of the formation such that they are, by themselves, non-hardening when introduced into the subterranean formation. One exemplary embodiment of a suitable tackifying agent comprises a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation.

Additional exemplary compounds which may be used as non-aqueous tackifying agents include liquids and solutions of, for example, polyesters, polycarbonates and polycarbamates, natural resins such as shellac and the like. Other suitable non-aqueous tackifying agents are described in U.S. Pat. Nos. 5,853,048 and 5,833,000, the disclosures of which are herein incorporated by reference as if fully set forth herein.

Non-aqueous tackifying agents may be either used such that they form a non-hardening coating or they may be combined with a multifunctional material capable of reacting with the tackifying compound to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the tackifying agent may function similarly to a hardenable resin.

Multifunctional materials suitable for use in the present invention include, but are not limited to, aldehydes, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde, aldehyde condensates, and silyl-modified polyamide compounds and the like, and combinations thereof. Suitable silyl-modified polyamide compounds that may be used in exemplary embodiments of the present invention include those that are substantially self-hardening compositions capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water.

In some embodiments, the multifunctional material may be mixed with the tackifying compound in an amount of from about 0.01 to about 50 percent by weight of the tackifying compound to effect formation of the reaction product. In some exemplary embodiments, the compound is present in an amount of from about 0.5 to about 1 percent by weight of the tackifying compound. Suitable multifunctional materials are described in U.S. Pat. No. 5,839,510, the disclosure of which is herein incorporated by reference as if fully set forth herein.

Solvents suitable for use with the tackifying agents include any solvent that is compatible with the tackifying agent and achieves the desired viscosity effect. The solvents that can be used in exemplary embodiments of the present invention preferably include those having high flash points (most preferably above about 125° F.). Examples of solvents suitable for use in exemplary embodiments of the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

Another type of tackifying agent suitable for use in an exemplary embodiment of the present invention includes aqueous tackifying agents. As used in this disclosure, the term "aqueous tackifying agent" refers to a tackifying agent that is soluble in water. Examples of suitable aqueous tackifying agents generally comprise charged polymers, that when in an aqueous solvent or solution, enhance the grain-to-grain contact between the individual particulates within the formation (e.g., proppant, gravel particulates, formation particulates, or other particulates), and may help bring about the consolidation of the particulates into a cohesive, flexible, and permeable mass. Examples of aqueous tackifying agents suitable for use in an exemplary embodiment of the present invention include, but are not limited to, acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester co-polymers, methacrylic acid derivative polymers, methacrylic acid homopolymers, methacrylic acid ester homopolymers (such as poly (methyl methacrylate), poly(butyl methacrylate), and poly(2-ethylhexyl methacryate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers, and combinations thereof. Examples of suitable aqueous tackifying agents are FDP-S706-3 and FDP-S800-05, which are available from Halliburton Energy Services, Inc. Examples of suitable aqueous tackifying agents are described in U.S. Pat. App. Pub. Nos. 2005/0277554 and 2005/0274517, the disclosures of which are incorporated herein by reference as if fully set forth herein.

Another example of a suitable aqueous tackifying agent comprises a benzyl coco di-(hydroxyethyl) quaternary amine, p-T-amyl-phenol condensed with formaldehyde, or a copolymer comprising from about 80% to about 100% $C_{1-30}$ alkylmethacrylate monomers and from about 0% to about 20% hydrophilic monomers. In some exemplary embodiments, the aqueous tackifying agent may comprise a copolymer that comprises from about 90% to about 99.5% 2-ethylhexylacrylate and from about 0.5% to about 10% acrylic acid. Suitable hydrophilic monomers may be any monomer that will provide polar oxygen-containing or nitrogen-containing groups. Suitable hydrophilic monomers include dialkyl amino alkyl (meth) acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or preferably acrylic acid, hydroxyethyl acrylate, acrylamide, and the like. These copolymers can be made by any suitable emulsion polymerization technique. Examples of these suitable tackifying agents are described in U.S. Pat. No. 5,249,627, the disclosure of which is incorporated herein by reference as if fully set forth herein. Methods of producing these copolymers are disclosed in U.S. Pat. No. 4,670,501, the disclosure of which is incorporated herein by reference as if fully set forth herein.

B. Exemplary Resin Compositions

Another example of a consolidating fluid that may be used in an exemplary embodiment of the present technique comprises a resin. Resins suitable for use may include any suitable resin that is capable of forming a hardened, consolidated mass. The term "resin" as used herein includes any of numerous physically similar polymerized synthetics or chemically modified natural resins, including but not limited to thermoplastic materials and thermosetting materials. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped downhole, they may be cured using only time and temperature. Other suitable resins, such as furan resins generally require a time-delayed catalyst or an external catalyst to help activate the polymerization of the resins if the cure temperature is low (e.g., less than 250° F.) but will cure under the effect of time and temperature if the formation temperature is above about 250° F., preferably above about 300° F. It is within the ability of one skilled in the art, with the benefit of this disclosure, to select a suitable resin for use in exemplary embodiments of the present invention and to determine whether a catalyst is needed to trigger curing.

Selection of a suitable resin may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable.

Any solvent that is compatible with the chosen resin and achieves the desired viscosity effect is suitable for use with the resin. Some exemplary solvents are those having high flash points (e.g., about 125° F.) because of, among other things, environmental and safety concerns; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d-limonene, fatty acid methyl esters, and combinations thereof. Other preferred solvents include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin chosen and is within the ability of one skilled in the art with the benefit of this disclosure.

C. Exemplary Gelable Compositions

Another example of a consolidating fluid that may be used in an exemplary embodiment of the present technique comprises gelable compositions. In general, suitable gelable compositions should cure to form a gel. Gelable compositions suitable for use in exemplary embodiments of the present invention include those compositions that cure to form a semi-solid, immovable, gel-like substance. Prior to curing, the gelable compositions should have low viscosities and be capable of flowing in pipe and into the subterranean formation. The gelable composition may be any gelable liquid composition capable of converting into a gelled substance capable of substantially plugging the permeability of the formation while allowing the formation to remain flexible. As referred to in this disclosure, the term "flexible" refers to a state wherein the treated formation is relatively malleable and elastic and able to withstand substantial pressure cycling without substantial breakdown of the formation. Thus, the resultant gelled substance stabilizes the treated portion of the formation while allowing the formation to absorb the stresses created during pressure cycling. As a result, the gelled substance may aid in preventing breakdown of the formation both by stabilizing and by adding flexibility to the treated region.

Examples of suitable gelable compositions include gelable aqueous silicate compositions, crosslinkable aqueous polymer compositions, gelable resins and polymerizable organic monomer compositions.

1. Exemplary Gelable Aqueous Silicate Compositions

In certain exemplary embodiments, the gelable compositions may comprise a gelable aqueous silicate composition. Suitable gelable aqueous silicate compositions for consolidating weakly consolidated formation intervals generally comprise aqueous alkali metal silicate solution and a catalyst (e.g., a temperature-activated catalyst) for gelling the aqueous alkali metal silicate solution. An example of a suitable gelable aqueous silicate compositions is INJECTEROL™ service, which is available from Halliburton Energy Services, Inc. Examples of suitable gelable aqueous silicate compositions are described in U.S. Pat. No. 4,466,831, the disclosure of which is incorporated herein by reference as if fully set forth herein.

The aqueous alkali metal silicate solution component of the gelable aqueous silicate compositions generally comprise an aqueous liquid and an alkali metal silicate. The aqueous liquid component of the aqueous alkali metal silicate solution generally may be fresh water, salt water (e.g., water containing one or more salts dissolved therein), brine (e.g., saturated salt water), seawater, or any other aqueous liquid that does not adversely react with the other components used in accordance with this invention or with the subterranean formation. Examples of suitable alkali metal silicates include, but are not limited to, one or more of sodium silicate, potassium silicate, lithium silicate, rubidium silicate, or cesium silicate. Of these, sodium silicate is preferred. While sodium silicate exists in many forms, the sodium silicate used in the aqueous alkali metal silicate solution preferably has a $Na_2O$-to-$SiO_2$ weight ratio in the range of from about 1:2 to about 1:4. Most preferably, the sodium silicate used has a $Na_2O$-to-$SiO_2$ weight ratio in the range of about 1:3.2. Generally, the alkali metal silicate is present in the aqueous alkali metal silicate solution component in an amount in the range of from about 0.1% to about 10% by weight of the aqueous alkali metal silicate solution component.

The temperature-activated catalyst component of the gelable aqueous silicate compositions is used, inter alia, to convert the gelable aqueous silicate compositions into the desired semi-solid, gel-like substance described above. Selection of a temperature-activated catalyst is related, at least in part, to the temperature of the subterranean formation to which the gelable aqueous silicate composition will be introduced. The temperature-activated catalysts that can be used in the gelable aqueous silicate compositions of exemplary embodiments of the present invention include, but are not limited to, ammonium sulfate (which is most suitable in the range of from about 60° F. to about 240° F.); sodium acid pyrophosphate (which is most suitable in the range of from about 60° F. to about 240° F.); citric acid (which is most suitable in the range of from about 60° F. to about 120° F.); and ethyl acetate (which is most suitable in the range of from about 60° F. to about 120° F.). Generally, the temperature-activated catalyst is present in the gelable aqueous silicate composition in the range of from about 0.1% to about 5% by weight of the gelable aqueous silicate composition.

2. Exemplary Crosslinkable Aqueous Polymer Compositions

In other exemplary embodiments, the gelable compositions may comprise a crosslinkable aqueous polymer composition. Suitable crosslinkable aqueous polymer compositions for consolidating weakly consolidated formation intervals generally comprise an aqueous solvent, a crosslinkable polymer, and a crosslinking agent. Such compositions are similar to those used to form gelled treatment fluids, such as fracturing fluids, but, according to the methods of exemplary embodiments the present invention, they are not exposed to breakers or de-linkers and so they retain their viscous nature over time. An example of a suitable crosslinkable polymer composition is H2-ZERO™ service, which is commercially available from Halliburton Energy Services, Inc. Examples of suitable crosslinkable aqueous polymer compositions are described in U.S. Pat. Nos. 5,836,392, 6,192,986, and 6,196,317, the disclosures of which are incorporated herein by reference as if fully set forth herein.

The aqueous solvent may be any aqueous solvent in which the crosslinkable composition and the crosslinking agent may be dissolved, mixed, suspended, or dispersed therein to facilitate gel formation. For example, the aqueous solvent used may be fresh water, salt water, brine, seawater, or any other aqueous liquid that does not adversely react with the other components used in accordance with exemplary embodiments of the present invention or with the subterranean formation.

Examples of crosslinkable polymers that can be used in the crosslinkable aqueous polymer compositions include, but are not limited to, carboxylate-containing polymers and acrylamide-containing polymers. Preferred acrylamide-containing polymers include polyacrylamide, partially hydrolyzed polyacrylamide, copolymers of acrylamide and acrylate, and carboxylate-containing terpolymers and tetrapolymers of acrylate. Additional examples of suitable crosslinkable polymers include hydratable polymers comprising polysaccharides and derivatives thereof and that contain one or more of the monosaccharide units galactose, mannose, glucoside, glucose, xylose, arabinose, fructose, glucuronic acid, or pyranosyl sulfate. Suitable natural hydratable polymers include, but are not limited to, guar gum, locust bean gum, tara, konjak, tamarind, starch, cellulose, karaya, xanthan, tragacanth, and carrageenan, and derivatives of all of the above. Suitable hydratable synthetic polymers and copolymers that may be used in the crosslinkable aqueous polymer compositions include, but are not limited to, polyacrylates, polymethacrylates, polyacrylamides, maleic anhydride, methylvinyl ether polymers, polyvinyl alcohols, and polyvinylpyrrolidone. The crosslinkable polymer used should be included in the crosslinkable aqueous polymer composition in an amount sufficient to form the desired gelled substance in the subterranean formation. In some exemplary embodiments of the present invention, the crosslinkable polymer is included in the crosslinkable aqueous polymer composition in an amount in the range of from about 1% to about 30% by weight of the aqueous solvent. In another exemplary embodiment of the present invention, the crosslinkable polymer is included in the crosslinkable aqueous polymer composition in an amount in the range of from about 1% to about 20% by weight of the aqueous solvent.

The crosslinkable aqueous polymer compositions of exemplary embodiments of the present invention further comprise a crosslinking agent for crosslinking the crosslinkable polymers to form the desired gelled substance. In some exemplary embodiments, the crosslinking agent is a molecule or complex containing a reactive transition metal cation. A most preferred crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV.

The crosslinking agent should be present in the crosslinkable aqueous polymer compositions of exemplary embodiments of the present invention in an amount sufficient to provide, inter alia, the desired degree of crosslinking. In some exemplary embodiments of the present invention, the crosslinking agent is present in the crosslinkable aqueous polymer compositions of the present invention in an amount in the range of from about 0.01% to about 5% by weight of the crosslinkable aqueous polymer composition. The exact type and amount of crosslinking agent or agents used depends upon the specific crosslinkable polymer to be crosslinked, formation temperature conditions, and other factors known to those individuals skilled in the art.

Optionally, the crosslinkable aqueous polymer compositions may further comprise a crosslinking delaying agent, such as a polysaccharide crosslinking delaying agent derived from guar, guar derivatives, or cellulose derivatives. The crosslinking delaying agent may be included in the crosslinkable aqueous polymer compositions, inter alia, to delay crosslinking of the crosslinkable aqueous polymer compositions until desired. One of ordinary skill in the art, with the benefit of this disclosure, will know the appropriate amount of the crosslinking delaying agent to include in the crosslinkable aqueous polymer compositions for a desired application.

3. Exemplary Gelable Resin Compositions

Certain exemplary embodiments of the gelable compositions comprise gelable resin compositions that cure to form flexible gels. Unlike the curable resin compositions described above, which cure into hardened masses, the gelable resin compositions cure into flexible, gelled substances that form resilient gelled substances between the particulates of the treated zone of the unconsolidated formation. Gelable resin compositions allow the treated portion of the formation to remain flexible and resist breakdown.

Generally, the gelable resin compositions useful in accordance with exemplary embodiments of the present invention comprise a curable resin, a diluent, and a resin curing agent. When certain resin curing agents, such as polyamides, are used in the curable resin compositions, the compositions form the semi-solid, gelled substances described above. Where the resin curing agent used may cause the organic resin compositions to form hard, brittle material rather than a desired gelled substance, the curable resin compositions may further comprise one or more "flexibilizer additives" (described in more detail below) to provide flexibility to the cured compositions.

Examples of gelable resins that can be used in exemplary embodiments of the present invention include, but are not limited to, organic resins such as polyepoxide resins (e.g., Bisphenol a-epichlorihydrin resins), polyester resins, urea-aldehyde resins, furan resins, urethane resins, and mixtures thereof. Of these, polyepoxide resins are preferred.

Any diluent that is compatible with the gelable resin and achieves the desired viscosity effect is suitable for use in exemplary embodiments of the present invention. Examples of diluents that may be used in the gelable resin compositions of the present invention include, but are not limited to, phenols; formaldehydes; furfuryl alcohols; furfurals; alcohols; ethers such as butyl glycidyl ether and cresyl glycidyl ether-phenyl glycidyl ether; and mixtures thereof. In some embodiments of the present invention, the diluent comprises butyl lactate. The diluent may be used to reduce the viscosity of the gelable resin composition from about 3 to about 3,000 centipoises ("cP") at 80° F. Among other things, the diluent acts to provide flexibility to the cured composition. The diluent may be included in the gelable resin composition in an amount sufficient to provide the desired viscosity effect. Generally, the diluent used is included in the gelable resin composition in amount in the range of from about 5% to about 75% by weight of the curable resin.

Generally, any resin curing agent that may be used to cure an organic resin is suitable for use in exemplary embodiments of the present invention. When the resin curing agent chosen is an amide or a polyamide, generally no flexibilizer additive will be required because, inter alia, such curing agents cause the gelable resin composition to convert into a semi-solid, gelled substance. Other suitable resin curing agents (such as an amine, a polyamine, methylene dianiline, and other curing agents known in the art) will tend to cure into a hard, brittle material and will thus benefit from the addition of a flexibilizer additive. Generally, the resin curing agent used is included in the gelable resin composition, whether a flexibilizer additive is included or not, in an amount in the range of from about 5% to about 75% by weight of the curable resin. In some exemplary embodiments of the present invention, the resin curing agent used is included in the gelable resin composition in an amount in the range of from about 20% to about 75% by weight of the curable resin.

As noted above, flexibilizer additives may be used, inter alia, to provide flexibility to the gelled substances formed from the curable resin compositions. Flexibilizer additives may be used where the resin curing agent chosen would cause the gelable resin composition to cure into a hard and brittle material—rather than a desired gelled substance. For example, flexibilizer additives may be used where the resin curing agent chosen is not an amide or polyamide. Examples of suitable flexibilizer additives include, but are not limited to, an organic ester, an oxygenated organic solvent, an aromatic solvent, and combinations thereof. Of these, ethers, such as dibutyl phthalate, are preferred. Where used, the flexibilizer additive may be included in the gelable resin composition in an amount in the range of from about 5% to about 80% by weight of the gelable resin. In some embodiments of the present invention, the flexibilizer additive may be included in the curable resin composition in an amount in the range of from about 20% to about 45% by weight of the curable resin.

4. Exemplary Polymerizable Organic Monomer Compositions

Suitable polymerizable organic monomer compositions for consolidating weakly consolidating formation intervals generally comprise an aqueous-base fluid, a water-soluble polymerizable organic monomer, an oxygen scavenger, and a primary initiator. An example of a suitable polymerizable organic monomer compositions is PERM-SEAL™ system, which is commercially available from Halliburton Energy Services, Inc. Examples of suitable polymerizable organic monomer compositions are described in U.S. Pat. Nos. 5,358,051 and 5,335,726, the disclosures of which are incorporated herein by reference as if fully set forth herein.

The aqueous-based fluid component of the polymerizable organic monomer composition generally may be fresh water, salt water, brine, seawater, or any other aqueous liquid that does not adversely react with the other components used in accordance with this invention or with the subterranean formation.

A variety of monomers are suitable for use as the water-soluble polymerizable organic monomers in exemplary embodiments of the present invention. Examples of suitable monomers include, but are not limited to, acrylic acid, methacrylic acid, acrylamide, methacrylamide, 2-methacrylamido-2-methylpropane sulfonic acid, 2-dimethylacrylamide, vinyl sulfonic acid, N,N-dimethylaminoethylmethacrylate, 2-triethylammoniumethylmethacrylate chloride, N,N-dimethyl-aminopropylmethacryl-amide, methacrylamidepropyl-triethylammonium chloride, N-vinyl pyrrolidone, vinyl-phosphonic acid, and methacryloyloxyethyl trimethylammonium sulfate, and mixtures thereof. Preferably, the water-soluble polymerizable organic monomer should be self-crosslinking. Examples of suitable monomers which are self crosslinking include, but are not limited to, hydroxyethylacrylate, hydroxymethylacrylate, hydroxyethylmethacrylate, N-hydroxymethylacrylamide, N-hydroxymethyl-methacrylamide, polyethylene glycol acrylate, polyethylene glycol methacrylate, polypropylene gylcol acrylate, polypropylene glycol methacrylate, and mixtures thereof. Of these, hydroxyethylacrylate is preferred. An example of a particularly preferable monomer is hydroxyethylcellulose-vinyl phosphoric acid.

The water-soluble polymerizable organic monomer (or monomers where a mixture thereof is used) should be included in the polymerizable organic monomer composition in an amount sufficient to form the desired gelled substance after placement of the polymerizable organic monomer composition into the subterranean formation. In some exemplary embodiments of the present invention, the water-soluble polymerizable organic monomer is included in the polymerizable organic monomer composition in an amount in the range of from about 1% to about 30% by weight of the aqueous-base fluid. In another exemplary embodiment of the present invention, the water-soluble polymerizable organic monomer is included in the polymerizable organic monomer composition in an amount in the range of from about 1% to about 20% by weight of the aqueous-base fluid.

The presence of oxygen in the polymerizable organic monomer composition may inhibit the polymerization process of the water-soluble polymerizable organic monomer or monomers. Therefore, an oxygen scavenger, such as stannous chloride, may be included in the polymerizable monomer composition. In order to improve the solubility of stannous chloride so that it may be readily combined with the polymerizable organic monomer composition on the fly, the stannous chloride may be pre-dissolved in a hydrochloric acid solution. For example, the stannous chloride may be dissolved in a 0.1% by weight aqueous hydrochloric acid solution in an amount of about 10% by weight of the resulting solution. The resulting stannous chloride-hydrochloric acid solution may be included in the polymerizable organic monomer composition in an amount in the range of from about 0.1% to about 10% by weight of the polymerizable organic monomer composition. Generally, the stannous chloride may be included in the polymerizable organic monomer composition of an exemplary embodiment of the present invention in an amount in the range of from about 0.005% to about 0.1% by weight of the polymerizable organic monomer composition.

The primary initiator is used, inter alia, to initiate polymerization of the water-soluble polymerizable organic monomer (s) used in an exemplary embodiment of the present invention. Any compound or compounds that form free radicals in aqueous solution may be used as the primary initiator. The free radicals act, inter alia, to initiate polymerization of the water-soluble polymerizable organic monomer present in the polymerizable organic monomer composition. Compounds suitable for use as the primary initiator include, but are not limited to, alkali metal persulfates; peroxides; oxidation-reduction systems employing reducing agents, such as sulfites in combination with oxidizers; and azo polymerization initiators. Preferred azo polymerization initiators include 2,2'-azobis(2-imidazole-2-hydroxyethyl) propane, 2,2'-azobis(2-aminopropane), 4,4'-azobis(4-cyanovaleric acid), and 2,2'-azobis(2-methyl-N-(2-hydroxyethyl) propionamide. Generally, the primary initiator should be present in the polymerizable organic monomer composition in an amount sufficient to initiate polymerization of the water-soluble polymerizable organic monomer(s). In certain exemplary embodiments of the present invention, the primary initiator is present in the polymerizable organic monomer composition in an amount in the range of from about 0.1% to about 5% by weight of the water-soluble polymerizable organic monomer (s). One skilled in the art will recognize that as the polymerization temperature increases, the required level of activator decreases.

Optionally, the polymerizable organic monomer compositions further may comprise a secondary initiator. A secondary initiator may be used, for example, where the immature aqueous gel is placed into a subterranean formation that is relatively cool as compared to the surface mixing, such as when placed below the mud line in offshore operations. The secondary initiator may be any suitable water-soluble compound or compounds that may react with the primary initiator to provide free radicals at a lower temperature. An example of a suitable secondary initiator is triethanolamine. In some exemplary embodiments of the present invention, the secondary initiator is present in the polymerizable organic monomer composition in an amount in the range of from about 0.1% to about 5% by weight of the water-soluble polymerizable organic monomer(s).

Also optionally, the polymerizable organic monomer compositions of exemplary embodiments of the present invention further may comprise a crosslinking agent for crosslinking the polymerizable organic monomer compositions in the desired gelled substance. In some exemplary embodiments, the crosslinking agent is a molecule or complex containing a reactive transition metal cation. A most preferred crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV. Generally, the crosslinking agent may be present in polymerizable organic monomer compositions in an amount in the range of from 0.01% to about 5% by weight of the polymerizable organic monomer composition.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of treating an interval of a subterranean formation having a first portion with a first water permeability and a second portion with a second water permeability wherein the first water permeability is not the same as the second water permeability, the method comprising:

contacting the first portion and the second portion of the interval with a water-soluble hydrophobically modified polymer capable of selectively reducing the effective permeability of the portion to water without a comparable reduction of the effective permeability of the interval to hydrocarbons, wherein the hydrophobically modified polymer modifies both the first water permeability and the second water permeability to a more uniform, third water permeability, and the third permeability of the interval to water is different from the first permeability by an amount up to about 40%; and treating the interval with a treatment fluid, wherein the first portion and the second portion both exhibit a more uniform, third permeability, thus allowing for a more uniform treatment of the interval by the treatment fluid than would be allowed without treatment of the interval with the hydrophobically modified polymer.

2. The method of claim 1, wherein the hydrophobically modified polymer contacts the at least one portion of the interval such that the effective permeability of the interval to hydrocarbons is modified.

3. The method of claim 1, wherein the hydrophobically modified polymer comprises a polymer containing a backbone, the backbone comprising polar heteroatoms.

4. The method of claim 1, wherein the hydrophobically modified polymer was synthesized from a hydrophilic polymer, the hydrophilic polymer comprising reactive amino groups in the polymer backbone or as pendant groups.

5. The method of claim 1, wherein the hydrophobically modified polymer was synthesized from a hydrophilic polymer, the hydrophilic polymer comprising dialkyl amino pendant groups.

6. The method of claim 1, wherein the hydrophobically modified polymer was synthesized from a hydrophilic polymer, the hydrophilic polymer comprising a dimethylamino pendant group and a monomer selected from the group consisting of dimethylaminoethyl methacrylate and dimethylaminopropyl methacrylamide.

7. The method of claim 1, wherein the hydrophobically modified polymer has an alkyl chain length of from about 12 carbons to about 18 carbons.

8. The method of claim 1, wherein the hydrophobically modified polymer comprises an amino methacrylate/alkyl amino methacrylate copolymer.

9. The method of claim 1, wherein the hydrophobically modified polymer comprises a hydrophobically modified polymer selected from the group consisting of an acrylamide/octadecyldimethylammoniumethyl methacrylate bromide copolymer; a dimethylaminoethyl methacrylate/vinyl pyrrolidone/hexadecyldimethylammoniumethyl methacrylate bromide terpolymer; an acrylamide/2-acrylamido-2-methyl propane sulfonic acid/2-ethylhexyl methacrylate terpolymer; and a dimethylaminoethyl methacrylate/hexadecyl-dimethylammoniumethyl methacrylate bromide copolymer.

10. The method of claim 1, wherein the treatment fluid comprises a consolidating fluid.

11. The method of claim 1 wherein the water-soluble hydrophobically modified polymer is present in the treatment fluid.

12. The method of claim 1, wherein the first portion, the second portion, or both comprise a water-producing interval and wherein the treatment fluid comprises a consolidating fluid introduced into the water-producing interval through a well bore to reduce the production of water from the water-producing interval.

13. The method of claim 12, wherein the hydrophobically modified polymer contacts the water producing interval such that the effective permeability of the water producing interval to hydrocarbons is modified.

14. The method of claim 12, comprising shutting in the well bore after introduction of the consolidating fluid into the well bore.

15. The method of claim 12, wherein the consolidating fluid comprises at least one fluid selected from the group consisting of a tackifying fluid, a resin composition, and gelable composition.

16. The method of claim 12, wherein the water-soluble hydrophobically modified polymer is present in the consolidating fluid.

17. The method of claim 1 wherein the interval comprises a weakly consolidated interval; wherein the treatment fluid comprises a consolidating fluid introduced into the weakly consolidated interval to reduce fines migration in the weakly consolidated interval.

18. The method of claim 17, wherein the hydrophobically modified polymer contacts a portion of the weakly consolidated interval near a well bore such that the effective permeability of the portion near the well bore to hydrocarbons is modified.

19. The method of claim 17, comprising shutting in the well bore after introduction of the consolidating fluid into the weakly consolidated interval.

20. The method of claim 17, comprising introducing an after-flush fluid into the weakly consolidated interval so at to restore permeability to the weakly consolidated interval, wherein the after-flush fluid is introduced after the consolidating fluid is introduced.

21. The method of claim 17, wherein the consolidating fluid comprises at least one fluid selected from the group consisting of a tackifying fluid, a resin composition, and gelable composition.

22. The method of claim 17, wherein the water-soluble hydrophobically modified polymer is present in the consolidating fluid.

23. The method of claim 1, wherein the water-soluble hydrophobically modified polymer comprises a polymer comprising hydrophilic monomers and hydrophobic compounds, wherein the mole ratio of hydrophilic monomer to hydrophobic compound in the polymer is in the range of from about 99.98:0.02 to about 90:10.

* * * * *